United States Patent
Du et al.

(10) Patent No.: US 7,543,013 B2
(45) Date of Patent: Jun. 2, 2009

(54) MULTI-STAGE FLOATING-POINT ACCUMULATOR

(75) Inventors: Yun Du, San Diego, CA (US); Chun Yu, San Diego, CA (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 11/506,349

(22) Filed: Aug. 18, 2006

(65) Prior Publication Data

US 2008/0046495 A1 Feb. 21, 2008

(51) Int. Cl.
G06F 7/38 (2006.01)
(52) U.S. Cl. .................................... 708/501
(58) Field of Classification Search ........... 708/501, 708/505
See application file for complete search history.

(56) References Cited

U.S. PATENT DOCUMENTS

| | | | | | |
|---|---|---|---|---|---|
| 4,841,467 | A | * | 6/1989 | Ho et al. ............... | 708/501 |
| 4,866,652 | A | | 9/1989 | Chu et al. | |
| 6,446,195 | B1 | * | 9/2002 | Ganapathy et al. .......... | 712/221 |
| 2002/0002573 | A1 | * | 1/2002 | Landers et al. ............ | 708/501 |
| 2002/0194240 | A1 | * | 12/2002 | Pangal et al. ............. | 708/501 |
| 2003/0154227 | A1 | | 8/2003 | Howard et al. | |

FOREIGN PATENT DOCUMENTS

| | | |
|---|---|---|
| EP | 0376266 | 7/1990 |
| EP | 0517241 | 12/1992 |
| GB | 2409074 | 6/2005 |

OTHER PUBLICATIONS

International Search Report - PCT/US07/076242 - International Search Authority, European Patent Office - Apr. 4, 2008.
Written Opinion - PCT/US07/076242 - International Search Authority, European Patent Office - Apr. 4, 2008.
International Preliminary Report on Patentability - PCT/US07/076242 - International Search Authority, European Patent Office - Oct. 8, 2008.

* cited by examiner

*Primary Examiner*—Tan V Mai
(74) *Attorney, Agent, or Firm*—George C. Pappas; Matthew J. Evans

(57) ABSTRACT

A multi-stage floating-point accumulator includes at least two stages and is capable of operating at higher speed. In one design, the floating-point accumulator includes first and second stages. The first stage includes three operand alignment units, two multiplexers, and three latches. The three operand alignment units operate on a current floating-point value, a prior floating-point value, and a prior accumulated value. A first multiplexer provides zero or the prior floating-point value to the second operand alignment unit. A second multiplexer provides zero or the prior accumulated value to the third operand alignment unit. The three latches couple to the three operand alignment units. The second stage includes a 3-operand adder to sum the operands generated by the three operand alignment units, a latch, and a post alignment unit.

23 Claims, 6 Drawing Sheets

MULTI-STAGE FLOATING-POINT ACCUMULATOR

BACKGROUND

I. Field

The present disclosure relates generally to electronics, and more specifically to a floating-point accumulator.

II. Background

In digital processors, numerical data may be expressed using integer or floating-point representation. Floating-point representation is used in many applications because of its ability to express a wide range of values and its ease of manipulation for some arithmetic operations. Floating-point representation typically includes three components: a sign bit (sign), a mantissa (mant) that is sometimes referred to as a significand, and an exponent (exp). A floating-point value may be expressed as $(-1)^{sign} \times mant \times 2^{exp}$.

Floating-point accumulation is an arithmetic operation that is commonly performed for various applications such as graphics, digital signal processing, etc. Floating-point accumulation typically entails (1) receiving an input floating-point value and an accumulated floating-point value, (2) aligning the mantissas of the two floating-point values based on their exponents, (3) summing the two aligned mantissas, and (4) post-aligning the result for normalization. Each of steps 2, 3 and 4 require some amount of time to perform. The total time for these steps may limit the speed at which a processor can operate.

SUMMARY

A multi-stage floating-point accumulator capable of operating at higher speed is described herein. The multi-stage floating-point accumulator partitions the steps for floating-point accumulation into multiple stages. The delay of each stage is a fraction of the total delay for all of the steps for floating-point accumulation. This allows the multi-stage floating-point accumulator to operate at higher clock speed.

In an embodiment, a floating-point accumulator comprises at least two stages. Each stage comprises functional logic and at least one latch to store at least one result for that stage. The floating-point accumulator performs accumulation on a plurality of floating-point values using accumulated results from at least two clock cycles earlier.

In an embodiment, the floating-point accumulator comprises two stages. In an embodiment, the first stage includes three operand alignment units, two multiplexers, and three latches. The three operand alignment units operate on a current floating-point value, a prior floating-point value, and a prior accumulated value from two clock cycles earlier. A first multiplexer provides zero or the prior floating-point value to the second operand alignment unit. A second multiplexer provides zero or the prior accumulated value to the third operand alignment unit. The three latches couple to the three operand alignment units. In an embodiment, the second stage includes a 3-operand adder that sums the operands generated by the three operand alignment units, a latch coupled to the 3-operand adder, and a post alignment unit coupled to the latch.

The multi-stage floating-point accumulator may be used in combination with a multiplier to perform multiply and accumulate (MAC) operation, which is commonly used for dot product, filtering, etc.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Floating-point accumulation in one stage may be expressed as:

$$\sum_{i=1}^{n} X_i = \sum_{i=1}^{n-1} X_i + X_n, \text{ for } 1 \leq n \leq N, \quad \text{Eq (1)}$$

where n is an index for the floating-point values being accumulated, $X_n$ is the n-th floating-point value being accumulated, with $X_0 = 0$, and N is the total number of floating-point values being accumulated. In general, N may be any positive integer value.

Equation (1) may be rewritten as follows:

$$A_n = A_{n-1} + X_n, \text{ for } 1 \leq n \leq N, \quad \text{Eq (2)}$$

where $A_n$ is an accumulated result for $X_1$ through $X_n$, with $A_0 = 0$. A final accumulated result $A_N$ is obtained after all N floating-point values $X_1$ through $X_N$ have been accumulated.

Figure 1:
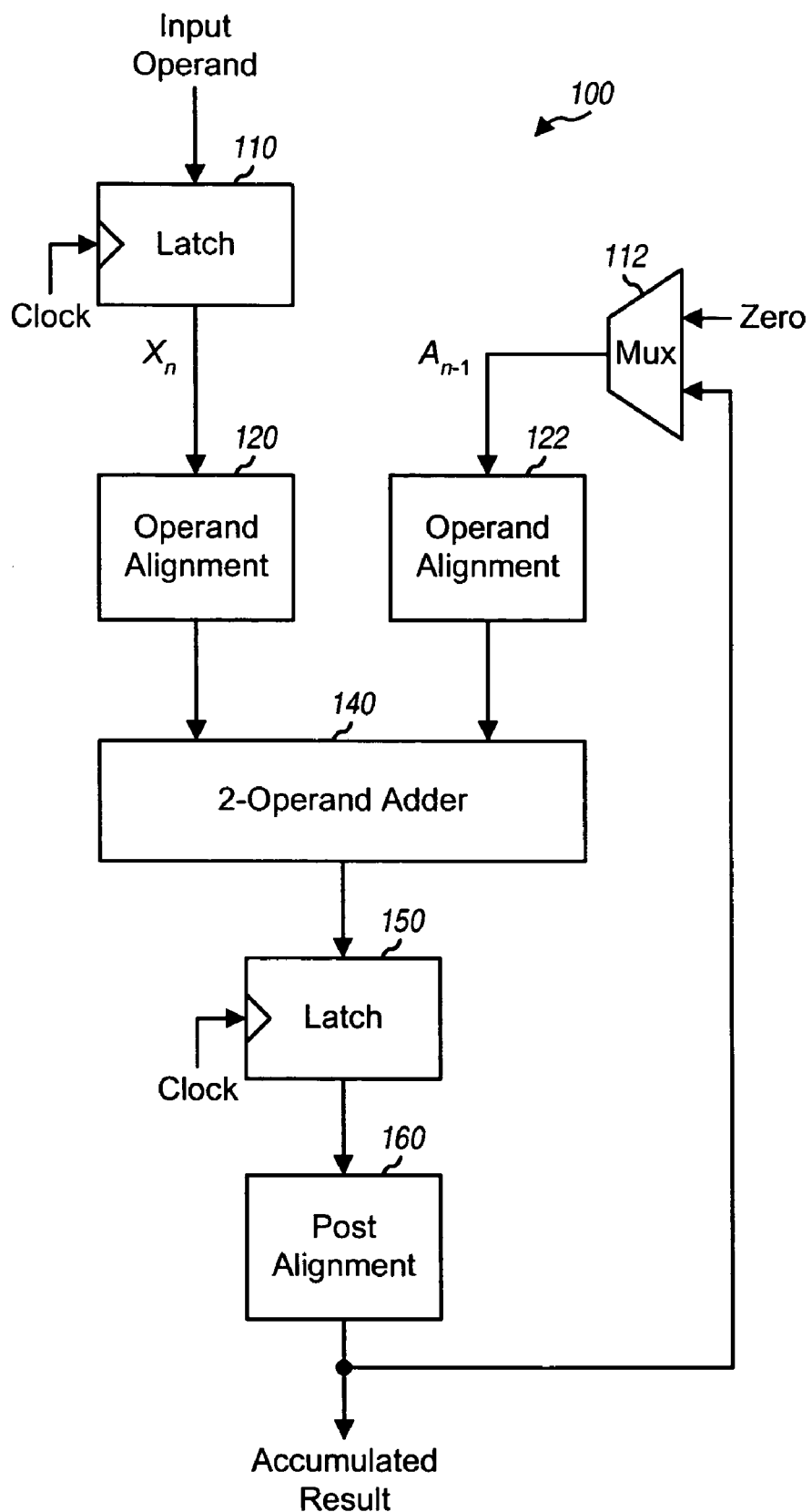
FIG. 1 shows a single-stage floating-point accumulator.

FIG. 1 shows a block diagram of a single-stage floating-point accumulator 100. A latch 110 receives and latches an input floating-point value, which is also referred to as an input operand, and provides the latched value as the current floating-point value $X_n$ to be accumulated. A multiplexer (Mux) 112 receives an accumulated result and zero (0.0) on two inputs. Multiplexer 112 provides zero if accumulation is starting or is disabled and provides the accumulated result if accumulation is continuing. The output of multiplexer 112 is the prior accumulated value $A_{n-1}$, in equation (2) and is to be summed with $X_n$.

Operand alignment units 120 and 122 receive operands $X_n$ and $A_{n-1}$, respectively. Units 120 and 122 align the mantissas of the two operands, e.g., by shifting the mantissa of one operand and adjusting its exponent until the exponents of the two operands are equal. A 2-operand adder 140 then sums the two aligned mantissas and provides a result mantissa and exponent. A latch 150 receives and latches the output of adder 140. A post-alignment unit 160 shifts the result mantissa and adjusts the exponent, as necessary, to obtain a normalized mantissa having a format of 1.xxx-xxx, where each "x" represents one binary bit. Unit 160 provides the normalized mantissa and exponent as the accumulated result.

Floating-point accumulator 100 has two signal paths—a first signal path for $X_n$ and a second signal path for $A_{n-1}$. The total delay of the first signal path is from latch 110 to latch 150 and is determined by the delays of operand alignment unit 120 and 2-operand adder 140. The total delay of the second signal path is determined by the delays of post-alignment unit 160, multiplexer 112, operand alignment unit 122, and 2-operand adder 140. The total delay of the second signal path is longer than the total delay of the first signal path and determines how fast latches 110 and 150 can be clocked. In particular, the clock speed for the latches may be selected such that each clock period is longer than the total delay of the second signal path. This total delay may be relatively long and hence limit the clock speed for floating-point accumulator 100.

Floating-point accumulator 100 may be used in a high performance and high-speed arithmetic logic unit (ALU) that may be operated at high clock speed. If floating-point accumulation cannot be completed in one clock period, then extra data dependency may be introduced between data pipelines utilizing the ALU. The data pipelines may need to wait until floating-point accumulator 100 provides the accumulated results. This data dependency may impact performance, especially for applications that extensively perform floating-point accumulation.

A multi-stage floating-point accumulator may be used to improve operating speed. The multi-stage floating-point accumulator partitions the steps for floating-point accumulation into multiple stages. The delay of each stage is a fraction of the total delay for all of the steps for accumulation. This allows the multi-stage floating-point accumulator to operate at higher clock speed.

Floating-point accumulation in two stages may be expressed as:

$$\sum_{i=1}^{n} X_i = \sum_{i=1}^{n-2} X_i + X_n + X_{n-1}, \text{ for } 1 \leq n \leq N, \quad \text{Eq (3)}$$

where $X_0 = X_{-1} = 0$.

Equation (3) may be rewritten as follows:

$$A_n = A_{n-2} + X_n + X_{n-1}, \text{for } 1 \leq n \leq N, \quad \text{Eq (4)}$$

where $A_0 = A_{-1} = 0$.

Figure 2:
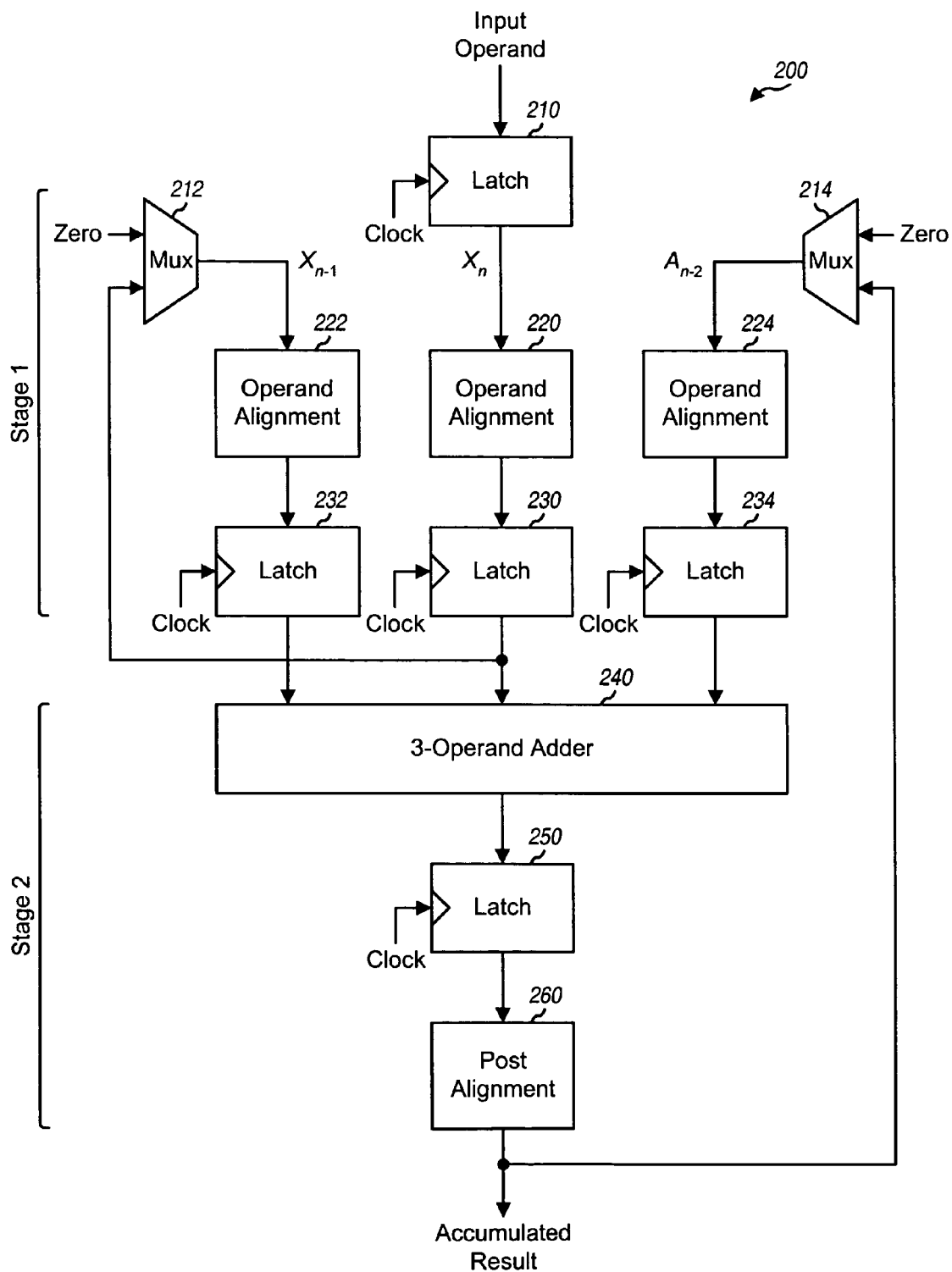
FIGS. 2 and 3 show two embodiments of a two-stage floating-point accumulator.

FIG. 2 shows a block diagram of an embodiment of a two-stage floating-point accumulator 200. A latch 210 receives and latches an input floating-point value and provides the current floating-point value $X_n$ to be accumulated. A multiplexer 212 receives the prior operand and zero, provides zero if accumulation is starting or is disabled, and provides the prior operand if accumulation is continuing. The output of multiplexer 212 is $X_{n-1}$, in equation (4) and is to be summed with $X_n$. A multiplexer 214 receives an accumulated result and zero, provides zero if accumulation is started within the last two clock periods or is disabled, and provides the accumulated result if accumulation is continuing. The output of multiplexer 214 is the prior accumulated value $A_{n-2}$ in equation (4) and is to be summed with $X_n$. Floating-point accumulator 200 is a pipeline with two clock cycles of delay. Thus, the current accumulated result from unit 260 is the prior accumulated value for two clock cycles earlier.

Operand alignment units 220, 222 and 224 receive operands $X_n$, $X_{n-1}$ and $A_{n-2}$, respectively. Units 220, 222 and 224 align the mantissas of the three operands, e.g., by shifting one or more mantissas of one or more operands and adjusting their exponents, as necessary, until the exponents of all three operands are equal. Latches 230, 232 and 234 receive and latch the outputs of units 220, 222 and 224, respectively. A 3-operand adder 240 sums the three aligned mantissas from latches 230, 232 and 234 and provides a result mantissa and exponent. A latch 250 receives and latches the output of adder 240. A post-alignment unit 260 shifts the result mantissa and adjusts the exponent, as necessary, to obtain a normalized mantissa. Unit 260 provides the accumulated result.

Floating-point accumulator 200 has two stages. The first stage may be considered as including multiplexer 212 through latch 234. The second stage may be considered as including 3-operand adder 240, latch 250, and post alignment unit 260. In general, each stage includes functional logic and at least one latch or register, which may be located anywhere within the stage. The latch(es) are used to store intermediate and/or final result(s) for the stage. Each stage is updated in each clock period.

Floating-point accumulator 200 has three signal paths—a first signal path for $X_n$, a second signal path for $X_{n-1}$, and a third signal path for $A_{n-2}$. The first signal path is partitioned into two segments: (1) a first segment from latch 210 to latch 230 and having a delay determined by the delay of operand alignment unit 220 and (2) a second segment from latch 230 to latch 250 and having a delay determined by the delay of 3-operand adder 240. The second signal path is partitioned into (1) a first segment from multiplexer 212 to latch 232 and having a delay determined by the delays of multiplexer 212 and operand alignment unit 222 and (2) a second segment from latch 232 to latch 250. The third signal path is partitioned into (1) a first segment from latch 250 to latch 234 and having a delay determined by the delays of post-alignment unit 260, multiplexer 214, and operand alignment unit 224 and (2) a second segment from latch 234 to latch 250. Each of the three signal paths is thus partitioned into two segments. The second segment is the same for all three signal paths.

Floating-point accumulator 200 thus has four different segments—three first segments for the three operands and the common second segment. The longest delay of all four segments determines how fast the latches can be clocked. This longest delay may be much shorter than the total delay of the second signal path in floating-point accumulator 100. Floating-point accumulator 200 may thus be operated at higher clock speed than floating-point accumulator 100.

Table 1 shows the outputs of latch 210, multiplexers 212 and 214, and post alignment unit 260 for accumulation of N floating-point values $X_1$ through $X_N$. Latch 210 provides the current floating-point value for each of clock cycles 1 through N. Multiplexer 212 provides zero for clock cycle 1 and the prior floating-point value for each of clock cycles 2 through N. Multiplexer 214 provides zero for each of clock cycles 1 and 2 and the prior accumulated value for each of clock cycles 3 through N. For clock cycle 3 and later, the output of unit 260 appears at the output of multiplexer 214 in the same clock cycle. A "—" in Table 1 denotes 'don't care' and may be any value.

TABLE 1

| Clock Cycle | Latch 210 Output | Multiplexer 212 Output | Multiplexer 214 Output | Post Alignment Unit 260 Output |
|---|---|---|---|---|
| 1 | $X_1$ | 0 | 0 | — |
| 2 | $X_2$ | $X_1$ | 0 | — |
| 3 | $X_3$ | $X_2$ | $A_1$ | $A_1 = X_1$ |
| 4 | $X_4$ | $X_3$ | $A_2$ | $A_2 = X_2 + X_1$ |
| 5 | $X_5$ | $X_4$ | $A_3$ | $A_3 = A_1 + X_3 + X_2$ |
| . | . | . | . | . |
| . | . | . | . | . |
| . | . | . | . | . |
| n | $X_n$ | $X_{n-1}$ | $A_{n-2}$ | $A_{n-2} = A_{n-4} + X_{n-2} + X_{n-3}$ |
| . | . | . | . | . |

TABLE 1-continued

| Clock Cycle | Latch 210 Output | Multiplexer 212 Output | Multiplexer 214 Output | Post Alignment Unit 260 Output |
|---|---|---|---|---|
| . | . | . | . | . |
| . | . | . | . | . |
| . | . | . | . | . |
| N | $X_N$ | $X_{N-1}$ | $A_{N-2}$ | $A_{N-2} = A_{N-4} + X_{N-2} + X_{N-3}$ |
| N + 1 | — | — | — | $A_{N-1} = A_{N-3} + X_{N-1} + X_{N-2}$ |
| N + 2 | — | — | — | $A_N = A_{N-2} + X_N + X_{N-1}$ |

As shown in FIG. 2 and Table 1, floating-point accumulator 200 is a pipeline with two clock cycles of delay. The final result $A_N$ is obtained two clock cycles after providing the last floating-point value $X_N$ to floating-point accumulator 200.

Floating-point accumulator 200 uses the accumulated result $A_{n-2}$ from two clock cycles earlier. This allows the signal path for the accumulated result to be partitioned into two segments having smaller delays. This partitioning also results in floating-point accumulator 200 using 3-operand adder 240, which has slightly longer delay than 2-operand adder 140 in FIG. 1. Nevertheless, floating-point accumulator 200 may be operated at higher speed.

The possible improvement in clock speed may be illustrated by a specific example. In this example, within floating-point accumulators 100 and 200, multiplexers 112 and 214 may have a delay of 0.2 nanosecond (ns), operand alignment units 122 and 224 may have a delay of 1.0 ns, 2-operand adder 140 may have a delay of 2.0 ns, 3-operand adder 240 may have a delay of 2.4 ns, and post alignment units 160 and 260 may have a delay of 1.0 ns. For floating-point accumulator 100, the signal path for $A_{n-1}$ has a total delay of 4.2 ns, and accumulator 100 may be operated at a clock speed of up to 238 megaHertz (MHz). For floating-point accumulator 200, the delay of the first segment is 2.2 ns, and the delay of the second segment is 2.4 ns. Floating-point accumulator 200 may then be operated at a clock speed of up to 416 MHz. The amount of improvement will likely be different for other designs.

FIG. 2 shows a specific embodiment of partitioning the third signal path for the accumulated result. The third signal path may also be partitioned in other manners. For example, latch 250 may be located after (instead of before) post alignment unit 260. The first segment would then include multiplexer 214 and operand alignment unit 224, and the second segment would include 3-operand adder 240 and post alignment unit 260. In general, the third signal path may be partitioned such that the two segments are matched in delay as well as possible, so that the difference between the delays of the two segments is as small as possible.

Figure 3:
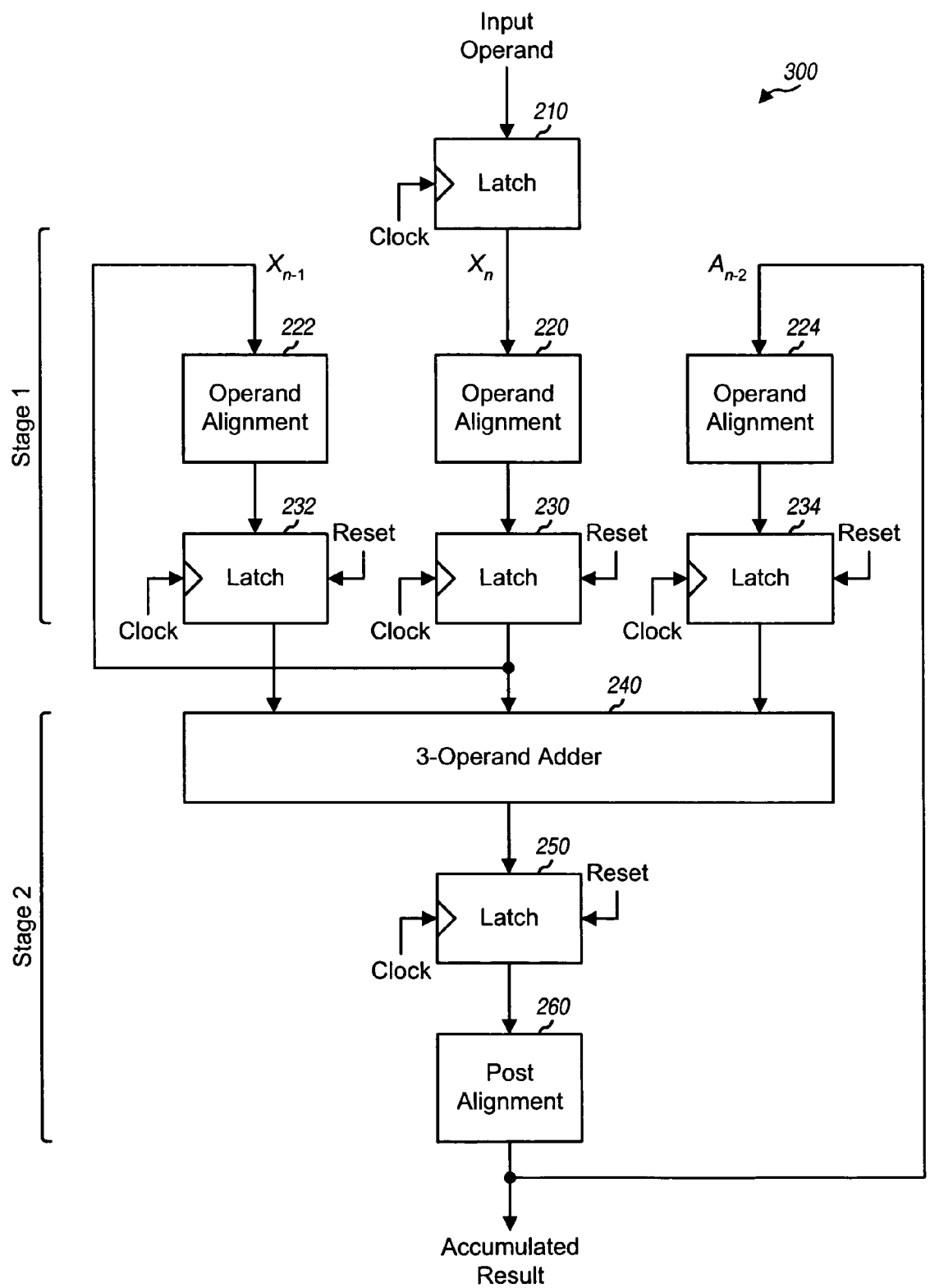

FIG. 3 shows a block diagram of an embodiment of a two-stage floating-point accumulator 300. Floating-point accumulator 300 includes all of the units of floating-point accumulator 200 in FIG. 2, except for multiplexers 212 and 214. The output of latch 230 is provided directly to operand alignment unit 222. The output of post alignment unit 260 is provided directly to operand alignment unit 224. Latches 230, 232, 234 and 250 receive a Reset signal that resets these latches to zero when accumulation is started. This embodiment removes multiplexers 212 and 214 and the associated delays of these multiplexers, which may allow floating-point accumulator 300 to operate at higher clock speed.

Floating-point accumulation may be performed in conjunction with other functions. For example, multiply and accumulate (MAC) operation is commonly used for various applications. Multiply and accumulation in two stages may be expressed as:

$$\sum_{i=1}^{n}(C_i \cdot D_i) = \sum_{i=1}^{n} Y_i \qquad \text{Eq (5)}$$
$$= \sum_{i=1}^{n-2} Y_i + Y_n + Y_{n-1},$$

for $1 \le n \le N$, where $Y_i = C_i \cdot D_i$, and $C_i$ and $D_i$ are the i-th pair of floating-point operands to be multiplied and accumulated.

Equation (5) may be rewritten as follows:

$$A_n = A_{n-2} + Y_n + Y_{n-1}, \text{ for } 1 \le n \le N. \qquad \text{Eq (6)}$$

Figure 4:
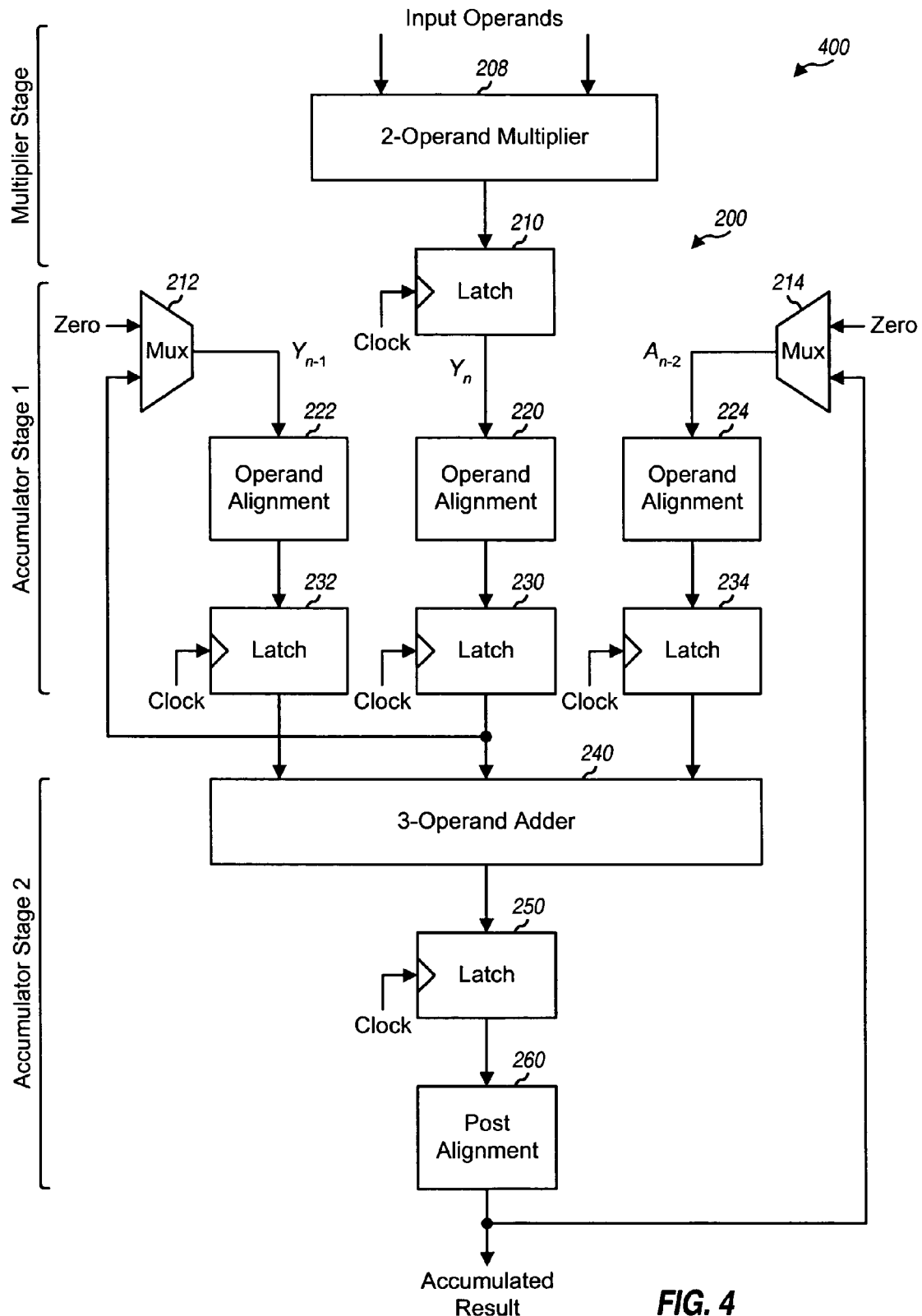
FIG. 4 shows a multiply and accumulate (MAC) unit.

FIG. 4 shows a block diagram of an embodiment of a MAC unit 400. MAC unit 400 includes a 2-operand multiplier 208 and two-stage floating-point accumulator 200. Multiplier 208 receives two operands to be multiplied and accumulated, multiplies the two operands, and provides the result to latch 210. Floating-point accumulator 200 performs accumulation on the result from latch 210, as described above for FIG. 2.

MAC unit 400 may be used for various applications such as graphics, digital signal processing, etc. MAC unit 400 may be used to perform dot product of two sequences of floating-point values, $\{C_1, C_2, \ldots, C_N\}$ and $\{D_1, D_2, \ldots, D_N\}$, as follows: $A_N = C_1 \cdot D_1 + C_2 \cdot D_2 + \ldots + C_N \cdot D_N$. Dot product is widely used for filtering, correlation, physics calculation for colliding objects in graphics, etc. MAC unit 400 may also be used to scale a sequence of floating-point values with a scalar and to accumulate the sequence of scaled values.

Accumulation may also be performed in combination with other functions. For example, multiplier 208 may be replaced with a scalar multiplier, an adder, a divider, an elementary function, a shifter, etc.

Floating-point accumulation may also be performed in more than two stages. For example, three stage floating-point accumulation may be expressed as:

$$\sum_{i=1}^{n} X_i = \sum_{i=1}^{n-3} X_i + X_n + X_{n-1} + X_{n-2}, \text{ for } 1 \le n \le N, \qquad \text{Eq (7)}$$

where $X_0 = X_{-1} = X_{-2} = 0$.

Equation (7) may be rewritten as follows:

$$A_n = A_{n-3} + X_n + X_{n-1} + X_{n-2}, \text{ for } 1 \le n \le N, \qquad \text{Eq (8)}$$

where $A_0 = A_{-1} = A_{-2} = 0$.

Equations (7) and (8) use an accumulated result $A_{n-3}$ from three clock cycles earlier. This allows the signal path for the accumulated result to be partitioned into three segments having smaller delay. For example, an additional latch may be inserted after post alignment unit 260 in FIG. 2. The third signal path for the accumulated result may then be partitioned into three segments, and the floating-point accumulator may be operated at even higher clock speed. A 4-operand adder may be used to sum the four operands in equation (8).

The multi-stage floating-point accumulator described herein may be used in various types of processors such as graphics processors (e.g., shaders), graphics processing units (GPUs), digital signal processors (DSPs), reduced instruction set computers (RISCs), advanced RISC machines (ARMs), etc. Exemplary uses of the multi-stage floating-point accumulator for a graphics processor and a wireless device are described below.

Figure 5:
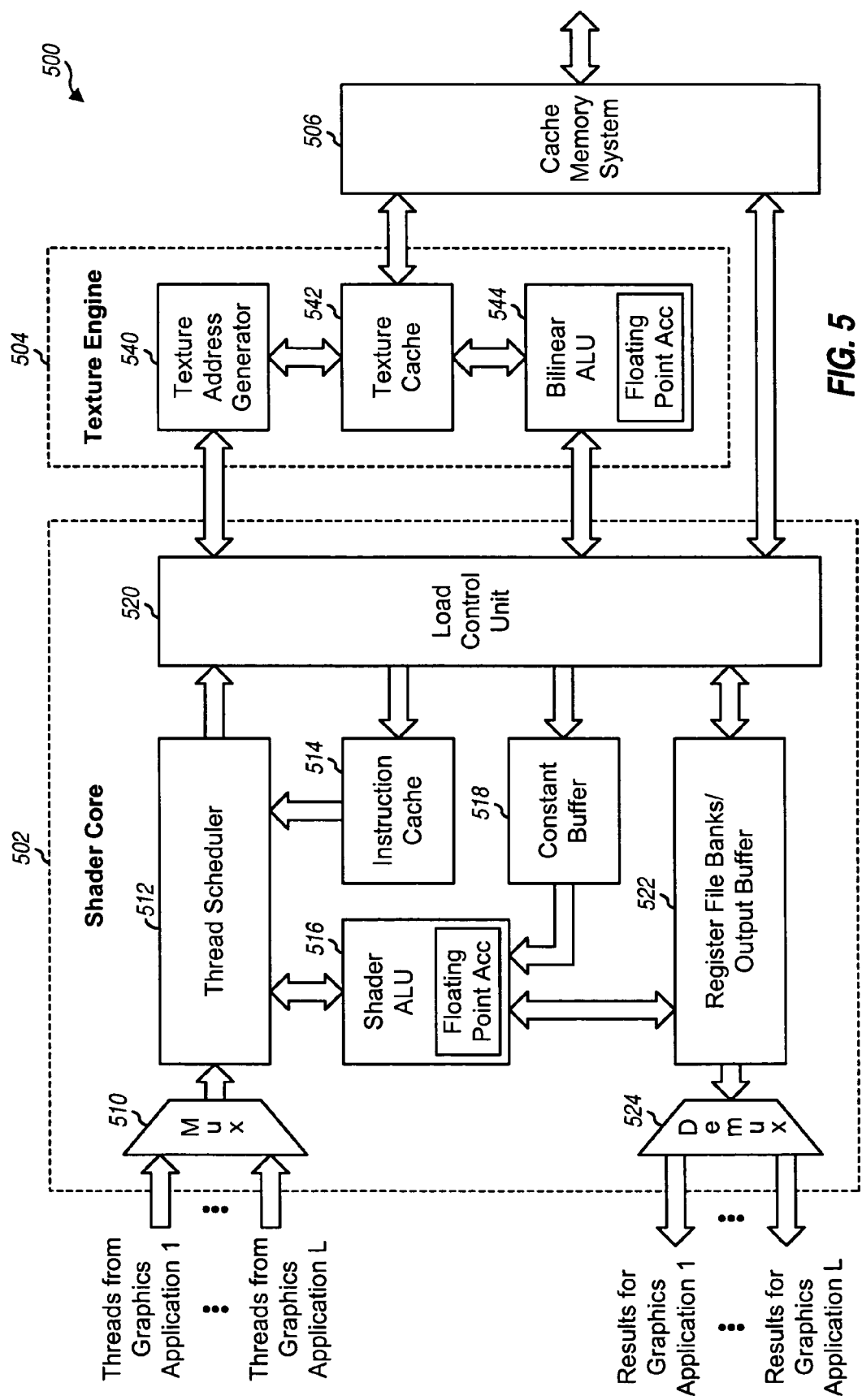
FIG. 5 shows a block diagram of a graphics processor.

FIG. 5 shows a block diagram of an embodiment of a graphics processor 500 that supports L graphics applications/programs, where in general L≧1. The L graphics applications may be for video games, graphics, etc., and may run concurrently. Graphics processor 500 includes a shader core 502, a texture engine 504, and a cache memory system 506. Shader core 502 may perform graphics operations such as shading, which is a highly complex graphics operation involving lighting, shadowing, etc. Texture engine 504 may perform graphics operations such as texture mapping. Texturing is achieved by modifying the color of pixels of an image with the color of a texture table/image. Cache memory system 506 may include one or more caches, which are fast memories that can store data and instructions for shader core 502 and texture engine 504.

Within shader core 502, a multiplexer 510 receives threads from the L graphics applications and provides these threads to a thread scheduler 512. Thread scheduler 512 performs various functions to schedule and manage execution of the threads. An instruction cache 514 stores instructions for the threads. These instructions indicate specific operations to be performed for each thread and may be loaded from cache memory system 506 and/or a main memory. An ALU 516 performs arithmetic operations, logical operations, format conversion, etc. ALU 516 may implement one or more multi-stage floating-point accumulators (Acc). A constant buffer 518 stores constant values used by ALU 516. A load control unit 520 controls the flow of data and instructions for various units within shader core 502. An output buffer 522 stores intermediate and final results from ALUs 516 and 544. A demultiplexer (Demux) 524 receives the final results for the executed threads from output buffer 522 and provides these results to the graphics applications.

Within texture engine 504, a texture address generator 540 computes the position of each pixel to be operated on by texture engine 504. A texture cache 542 stores pixels for texture engine 504. An ALU 544 performs computation on the pixels and provides intermediate results, which may be stored back in output buffer 522. ALU 544 may also implement one or more multi-stage floating-point accumulators.

Figure 6:
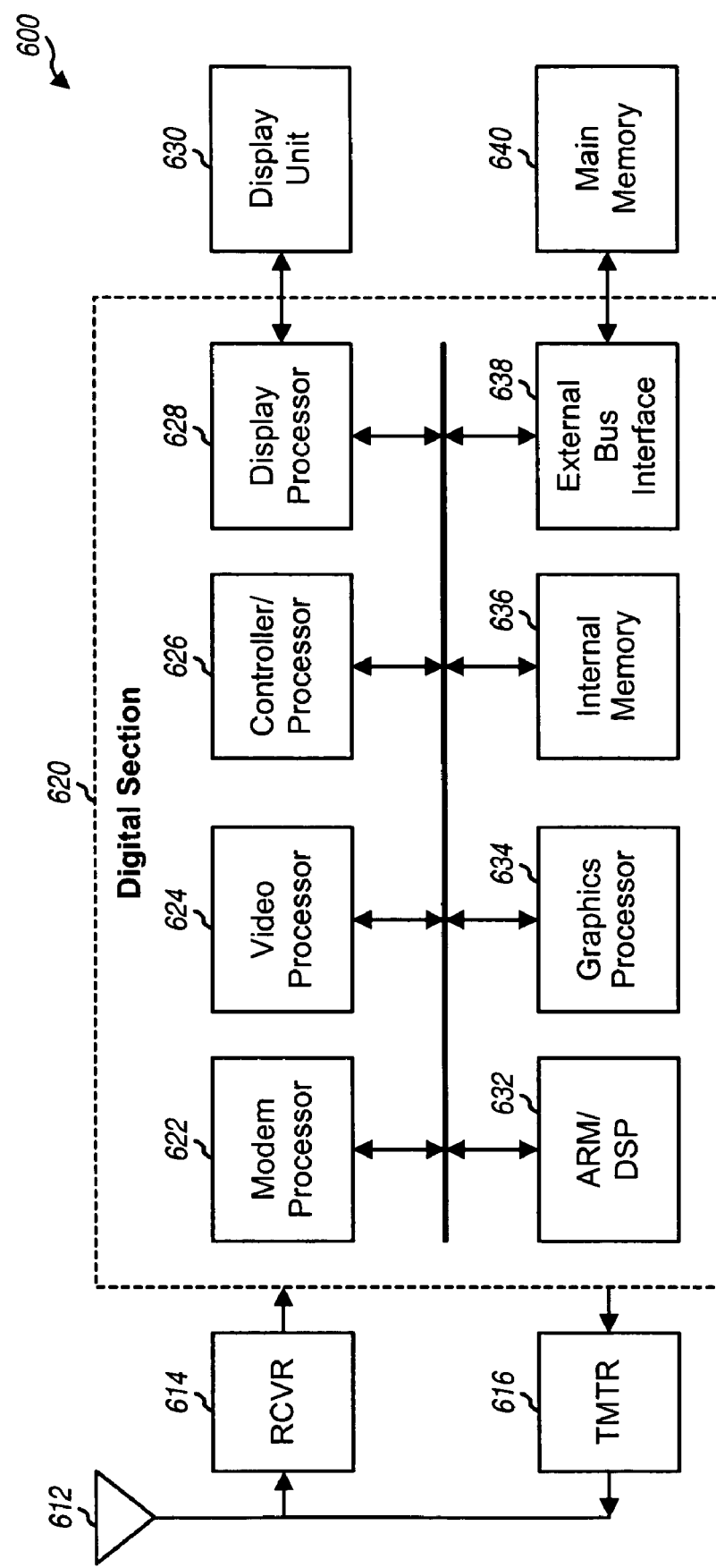
FIG. 6 shows a block diagram of a wireless device.

FIG. 6 shows a block diagram of an embodiment of a wireless device 600 in a wireless communication system. Wireless device 600 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 600 is capable of providing bi-directional communication via a receive path and a transmit path. On the receive path, signals transmitted by base stations are received by an antenna 612 and provided to a receiver (RCVR) 614. Receiver 614 conditions and digitizes the received signal and provides samples to a digital section 620 for further processing. On the transmit path, a transmitter (TMTR) 616 receives data to be transmitted from digital section 620, processes and conditions the data, and generates a modulated signal, which is transmitted via antenna 612 to the base stations.

Digital section 620 includes various processing, interface and memory units such as, for example, a modem processor 622, a video processor 624, a controller/processor 626, a display processor 628, an ARM/DSP 632, a graphics processor 634, an internal memory 636, and an external bus interface (EBI) 638. Modem processor 622 performs processing for data transmission and reception (e.g., encoding, modulation, demodulation, and decoding). Video processor 624 performs processing on video content (e.g., still images, moving videos, and moving texts) for video applications such as camcorder, video playback, and video conferencing. Controller/processor 626 may direct the operation of various processing and interface units within digital section 620. Display processor 628 performs processing to facilitate the display of videos, graphics, and texts on a display unit 630.

ARM/DSP 632 may perform various types of processing for wireless device 600. Graphics processor 634 performs graphics processing. Processors 622 through 634 may each implement one or more multi-stage floating-point accumulators. Internal memory 636 stores data and/or instructions for various units within digital section 620. EBI 638 facilitates transfer of data between digital section 620 (e.g., internal memory 636) and a main memory 640.

Digital section 620 may be implemented with one or more DSPs, micro-processors, RISCs, etc. Digital section 620 may also be fabricated on one or more application specific integrated circuits (ASICs) or some other type of integrated circuits (ICs).

The multi-stage floating-point accumulator described herein may be implemented in various hardware units. For example, the floating-point accumulator may be implemented in ASICs, DSPs, digital signal processing devices (DSPDs), programmable logic devices (PLDs), field programmable gate arrays (FPGAs), processors, controllers, micro-controllers, microprocessors, electronic devices, and other electronic units.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A processor comprising:
    a multi-stage floating-point accumulator operative to perform accumulation on a plurality of floating-point values and comprising a j-operand adder and j-1 stages, each stage comprising at least one latch operative to store at least one result for the stage, the j-operand adder operative to sum input comprising a current floating-point value, j-2 floating-point delayed values and an accumulated floating-point value.

2. The processor of claim 1, wherein the floating-point accumulator is operative to perform accumulation, such that a result output by the j-operand adder is input to the j-operand adder as the accumulated floating-point value j-1 clock cycles later.

3. The processor of claim 1, wherein the floating-point accumulator is a pipeline with j-1 stages and j-1 has clock cycles of delay.

4. The processor of claim 1, wherein the floating-point accumulator comprises
    a first operand alignment unit for the current floating-point value,
    j-2 second operand alignment units, each of the j-2 second operand alignment units for one of the j-2 floating-point delayed values, and a third operand alignment unit for the accumulated floating-point value.

5. The processor of claim 4, wherein the floating-point accumulator further comprises j-2 first multiplexers, each of the j-2 first multiplexers for one of the j-2 floating point delayed values and being operative to provide zero or a corresponding floating-point delayed value to a corresponding one of the second operand alignment units and a second multiplexer operative to provide zero or the accumulated floating-point value to the third operand alignment unit.

6. The processor of claim 4, wherein the at least one latch of the floating-point accumulator further comprises a first latch, j-2 second latches and a third latch coupled to the first, j-2 second and third operand alignment units, respectively.

7. The processor of claim 4, wherein the j-operand adder of the floating-point accumulator is operative to sum operands generated by the first, j-2 second and third operand alignment units.

8. The processor of claim 1, wherein j equals three and the j-operand adder comprises a 3-operand adder, the floating-point accumulator further comprises the 3-operand adder operative to sum input comprising the current floating-point value, one floating-point delayed value, and the accumulated floating-point value.

9. The processor of claim 1, wherein the at least one latch of the floating-point accumulator further comprises a latch coupled to the j-operand adder, and a post alignment unit coupled to the latch coupled to the j-operand adder.

10. The processor of claim 1, further comprising:

a multiplier operative to multiply input operands and provide the plurality of floating-point values to the floating-point accumulator.

11. The processor of claim 10, wherein the multiplier and the floating-point accumulator are operative to multiply and accumulate two sequences of operands.

12. An integrated circuit, comprising:

a multi-stage floating-point accumulator operative to perform accumulation on a plurality of floating-point values and comprising a j-operand adder and j-1 stages, each stage comprising at least one latch operative to store at least one result for the stage, the j-operand adder operative to sum input comprising a current floating-point value, j-2 floating-point delayed values and an accumulated floating-point value.

13. The integrated circuit of claim 12, wherein the floating-point accumulator is operative to perform accumulation, such that a result output by the j-operand adder is input to the j-operand adder as the accumulated floating-point value j-1 clock cycles later.

14. The integrated circuit of claim 12, wherein the floating-point accumulator comprises a first operand alignment unit for the current floating-point value, j-2 second operand alignment units, each of the j-2 second operand alignment units for one of the j-2 floating-point delayed values, and a third operand alignment unit for the accumulated floating-point value.

15. The integrated circuit of claim 14, wherein the floating-point accumulator further comprises operative to sum operands generated by the first, j-2 second and third operand alignment units.

16. The integrated circuit of claim 15, wherein the floating-point accumulator further comprises a fourth latch coupled to the 3-operand adder, and a post alignment unit coupled to the fourth latch.

17. The integrated circuit of claim 12, further comprising:

a multiplier operative to multiply input operands and provide the plurality of floating-point values to the floating-point accumulator.

18. A graphics processor comprising:

at least one arithmetic logic unit (ALU), each ALU comprising a multi-stage floating-point accumulator operative to perform accumulation on a plurality of floating-point values and comprising a j-operand adder and j-1 stages, each stage comprising at least one latch operative to store at least one result for the stage, the j-operand adder operative to sum input comprising a current floating-point value, j-2 floating-point delayed values and an accumulated floating-point value; and a memory coupled to the at least one ALU.

19. The graphics processor of claim 18, wherein the floating-point accumulator comprises a first operand alignment unit for the current floating-point value, j-2 second operand alignment units, each of the j-2 operand alignment units for one of the j-2 floating-point delayed values, a third operand alignment unit for the accumulated floating-point value, and the j-operand adder operative to sum operands generated by the first, j-2 second and third operand alignment units.

20. The graphics processor of claim 8, wherein each ALU further comprises a multiplier operative to multiply input operands and provide the plurality of floating-point values to the floating-point accumulator.

21. The graphics processor of claim 18 further comprising a shader core operative to perform graphics operations using the at least one ALU.

22. The graphics processor of claim 18, further comprising a texture engine operative to perform texture mapping using the at least one ALU.

23. A wireless device comprising:

a graphics processor comprising a multi-stage floating-point accumulator operative to perform accumulation on a plurality of floating-point values and comprising a j-operand adder and j-1 stages, each stage comprising at least one latch operative to store at least one result for the stage, the j-operand adder operative to sum input comprising a current floating-point value, j-2 floating-point delayed values and an accumulated floating-point value.

* * * * *

UNITED STATES PATENT AND TRADEMARK OFFICE
CERTIFICATE OF CORRECTION

PATENT NO.        : 7,543,013 B2                                    Page 1 of 1
APPLICATION NO.   : 11/506349
DATED             : June 2, 2009
INVENTOR(S)       : Du et al.

It is certified that error appears in the above-identified patent and that said Letters Patent is hereby corrected as shown below:

Column 8, line 59, claim 3: "j-1 has clock" to read as --j-1 clock--

Column 10, line 37, claim 20: "of claim 8," to read as --of claim 18,--

Signed and Sealed this
Twenty-fourth Day of May, 2011

David J. Kappos
*Director of the United States Patent and Trademark Office*